United States Patent
Berger et al.

(10) Patent No.: US 7,856,653 B2
(45) Date of Patent: Dec. 21, 2010

(54) METHOD AND APPARATUS TO PROTECT POLICY STATE INFORMATION DURING THE LIFE-TIME OF VIRTUAL MACHINES

(75) Inventors: Stefan Berger, New York, NY (US); Trent Ray Jaeger, Port Matilda, PA (US); Ronald Perez, Mount Kisco, NY (US); Reiner Sailer, Scarsdale, NY (US); Enriquillo Valdez, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/392,349

(22) Filed: Mar. 29, 2006

(65) Prior Publication Data

US 2007/0239979 A1 Oct. 11, 2007

(51) Int. Cl.
*G06F 17/00* (2006.01)
(52) U.S. Cl. .................. 726/1; 726/2; 726/22; 726/30; 713/150; 713/165; 713/167; 718/1; 718/100; 717/126; 717/137
(58) Field of Classification Search .................... 726/1, 726/2, 26, 27, 30; 713/150, 155, 156, 157, 713/165, 166, 167, 170; 709/225; 718/1, 718/100
See application file for complete search history.

(56) References Cited

U.S. PATENT DOCUMENTS

| 6,408,326 B1 | 6/2002 | Larsson et al. |
| 6,697,857 B1 | 2/2004 | Dixon et al. |
| 6,708,310 B1* | 3/2004 | Sung et al. .................. 715/210 |
| 6,898,604 B1* | 5/2005 | Ballinger et al. .................... 1/1 |
| 6,950,818 B2 | 9/2005 | Dennis et al. |
| 7,334,223 B2* | 2/2008 | Kumar et al. ................ 717/137 |
| 7,428,583 B1* | 9/2008 | Lortz et al. .................. 709/223 |
| 7,493,602 B2* | 2/2009 | Jaeger et al. ................ 717/137 |
| 7,503,038 B2* | 3/2009 | Pandit et al. ................ 717/126 |
| 7,519,606 B2* | 4/2009 | Hernandez-Sherrington et al. ................................. 1/1 |
| 7,647,415 B1* | 1/2010 | Sandoz et al. ............... 709/230 |
| 7,664,828 B2* | 2/2010 | Schlimmer et al. .......... 709/217 |
| 2003/0115559 A1* | 6/2003 | Sawada ......................... 716/5 |
| 2004/0103315 A1 | 5/2004 | Cooper et al. |
| 2004/0128556 A1 | 7/2004 | Burnett |
| 2004/0204949 A1 | 10/2004 | Shaji et al. |
| 2004/0216150 A1 | 10/2004 | Scheifler et al. |
| 2005/0021978 A1 | 1/2005 | Bhat et al. |
| 2005/0044487 A1 | 2/2005 | Bellegarda et al. |

(Continued)

OTHER PUBLICATIONS

Li Gong, "Java Security Architecture (JDK1.2)", pp. 1-64, version 1.0, Sun Microsystems Inc., Oct. 1998.*

(Continued)

*Primary Examiner*—Nasser Moazzami
*Assistant Examiner*—Shanto M Abedin
(74) *Attorney, Agent, or Firm*—Yee & Associates, P.C.; Preston J. Young

(57) ABSTRACT

A scheme for protecting policy state information during the lifetime of a virtual machine is presented. In order to protect and preserve the policy state information of the virtual machine, a process creates a source policy, a mapping policy, and a binary policy. These policies are all different representations of a security policy. The different policy representations are chained together via cryptographic hashes.

20 Claims, 4 Drawing Sheets

U.S. PATENT DOCUMENTS

| | | |
|---|---|---|
| 2005/0182957 A1 | 8/2005 | Della-Libera et al. |
| 2005/0188072 A1 | 8/2005 | Lee, IV et al. |
| 2005/0198326 A1 | 9/2005 | Schlimmer et al. |
| 2005/0226059 A1* | 10/2005 | Kavuri et al. ......... 365/189.05 |
| 2006/0015625 A1* | 1/2006 | Ballinger et al. ............ 709/229 |
| 2006/0041636 A1* | 2/2006 | Ballinger et al. ............ 709/218 |
| 2006/0059537 A1* | 3/2006 | Alvermann et al. ............ 726/1 |
| 2006/0174320 A1* | 8/2006 | Maru et al. ................... 726/1 |
| 2007/0157203 A1* | 7/2007 | Lim ........................... 718/100 |
| 2008/0196008 A1* | 8/2008 | Branton et al. .............. 717/120 |

OTHER PUBLICATIONS

Ralph Keller et al, "Binary Component Adaptation", pp. 307-329, Springer-Verlag, 1998.*

McCarty, "SELinux: NSA's Open Source Security Enhanced Linux", O'Reilly, Chapter 4, Oct. 2004, pp. 63-94.

* cited by examiner

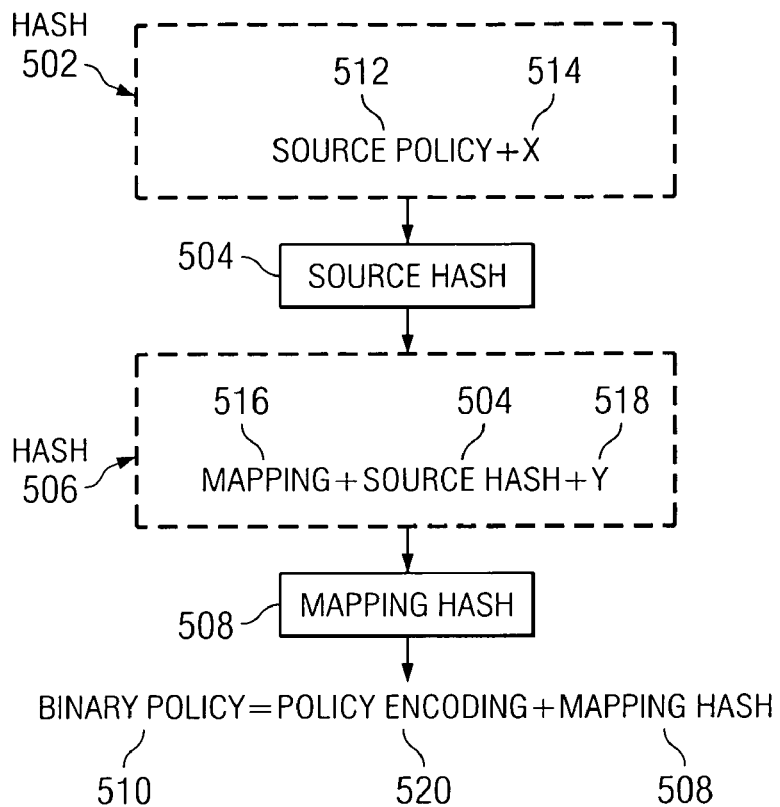
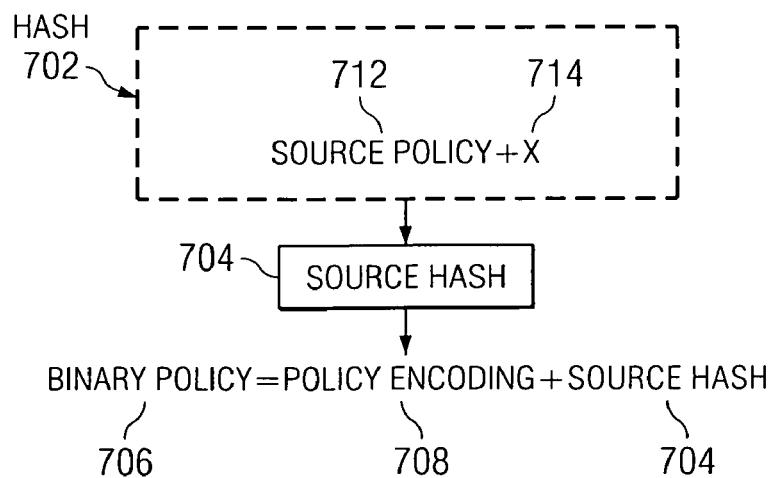

METHOD AND APPARATUS TO PROTECT POLICY STATE INFORMATION DURING THE LIFE-TIME OF VIRTUAL MACHINES

BACKGROUND OF THE INVENTION

1. Field of the Invention

The present invention relates generally to a data processing system. Specifically, the present invention provides a computer implemented method, a data processing system, and a computer program product for protecting policy state information during the lifetime of a virtual machine.

2. Description of the Related Art

The interest in support for computing on virtualizeable systems is growing as hardware virtualization becomes available for common, off the shelf hardware. Being able to run multiple operating systems on one machine will not remain an area only for high-end servers but will become widely available. To support a distributed computing base, individual systems need to be able to determine if they are running compatible security policies without intervention from a third party.

Virtualization is enabled through the support of an additional software layer underneath operating systems or on top of an operating system. Usually operating systems run directly on the hardware. However, in a virtualized system, a layer called a 'hypervisor' or 'virtual machine monitor' provides isolated run-time environments called virtual machines that have operating systems running inside. If the hypervisor runs directly on the hardware, it becomes the lowest layer in the system.

Modern virtualization technologies enable the migration of a virtual machine from one physical platform to another physical platform. If the operating system inside the virtual machine is associated with a particular security policy, then that virtual machine should only be migrated to a new physical platform that supports the same security policy.

Due to the limited availability of hardware resources, such as network adapters and hard drives, for example, virtualized systems rely on service virtual machines to multiplex access to hardware resources. Service virtual machines that provide network access to operating systems running on the same physical platform can restrict communication to external systems that enforce compatible policies.

SUMMARY OF THE INVENTION

The invention describes a computer implemented method and a data processing system protecting policy state information during the lifetime of a virtual machine. In order to protect and preserve the policy state information of the virtual machine, a process creates a source policy, a mapping policy, and a binary policy. These polices are all different representations of a security policy. The different policy representations are chained together via cryptographic hashes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram illustrating hash generation, in accordance with an exemplary embodiment of the present invention;

FIG. 7 is a block diagram illustrating a simplified hash generation of a binary policy, in accordance with an exemplary embodiment of the present invention.

DETAILED DESCRIPTION OF THE PREFERRED EMBODIMENT

Figure 1:
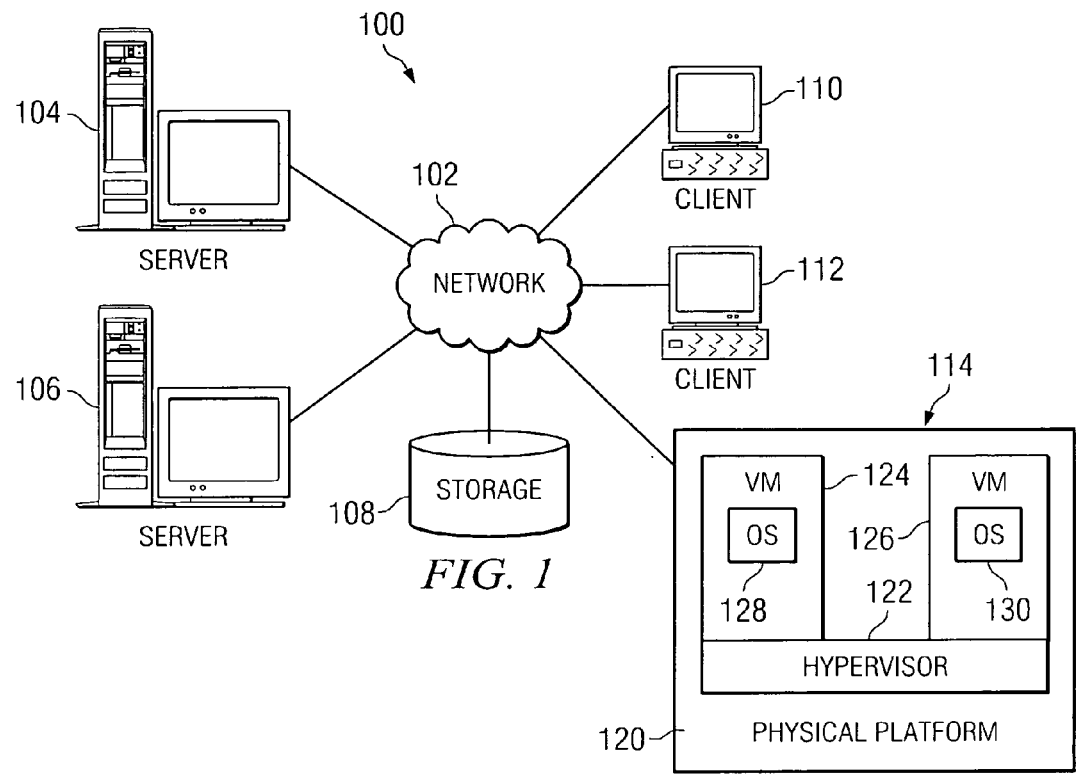
FIG. 1 is a pictorial representation of a network of data processing systems in which exemplary aspects of the present invention may be implemented.
Figure 2:
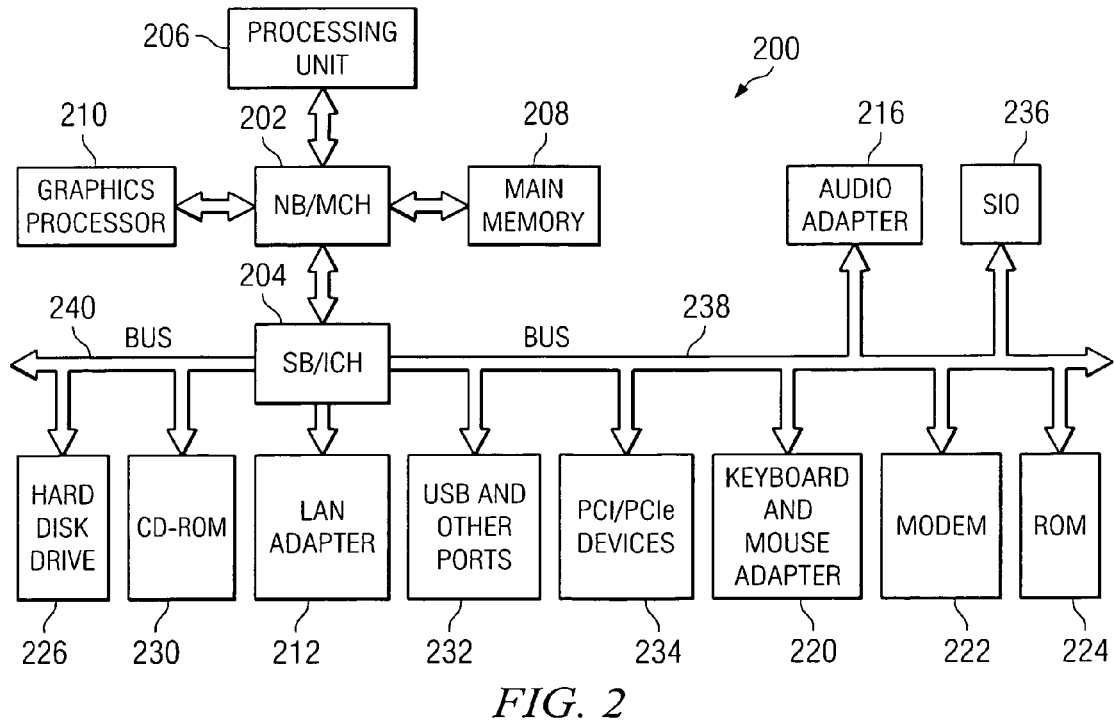
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Client 114 comprises physical platform 120, hypervisor 122, virtual machines VM 124 and 126, and operating systems OS 128 and 130. Hypervisor 122 runs on physical platform 120 and allows multiple instances of virtual machines and operating systems to be executed simultaneously on a single physical platform. In client 114, hypervisor 122 is depicted as having two virtual machines, VM 124 and 126 running, but additional virtual machines, not shown, may be running at the same time as VMs 124 and 126. Each virtual machine has its own operating system executing within it. In client 114, virtual machine VM 124 has operating system OS 128 executing within VM 124, and virtual machine VM 126 shows operating system OS 130 executing within VM 126. OSs 128 and 130 may be completely different operating systems or separate instances of the same operating system.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, ROM 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
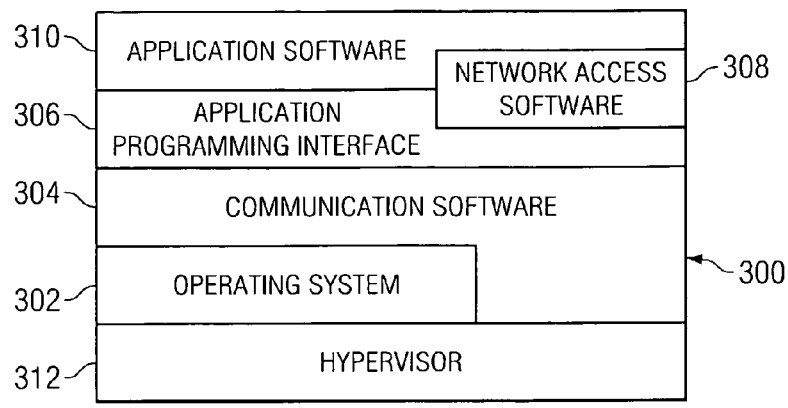
FIG. 3 is a block diagram showing typical software architecture for a server-client system in accordance with a preferred embodiment of the present invention.

Turning to FIG. 3, typical software architecture, generally designated by reference number 300, for a server-client system is depicted in accordance with a preferred embodiment of the present invention. Operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks. Applications at this level may include those necessary to handle data, video, graphics, photos or text, which can be accessed by users of the Internet. Hypervisor 312 is a layer of software running on a physical platform that allows multiple instances of operating systems to be executed simultaneously on a single platform.

An exemplary embodiment of the present invention provides for the establishment of a trusted distributed computing base. Exemplary aspects of the present invention offer the ability to verify security properties of other systems in real-time, without requiring, but allowing for, the use of a third party. Exemplary aspects of the present invention also allow for one system to autonomously decide if the system will allow another system into the system's trust boundaries.

Each system is able to determine if the physical platform is running or enforcing a security policy that is compatible with another physical platform without the need for a third party application. A security policy is a term that denotes security identifiers and rules that govern virtual machine access and restrictions to virtual and physical resources on the physical platform. In order to ensure policy state information during the lifetime of a virtual machine, different representations of the security policy are chained together via cryptographic hashes.

The security policy representations that are linked together via hashes are a source policy, a mapping policy, and a binary policy. The source policy is a concrete instantiation of the security policy. The source policy is a high level, semantic rich, readable definition of the attributes associated with the security policy. The source policy is the policy representation that users and user tools understand. An example of this is a source policy written in XML. The binary policy is also a concrete instantiation of the security policy. The binary policy is derived from the source policy representation. The binary policy is the policy representation understood by the hypervisor. The mapping policy, or file, is a file that contains symbolic label information that maps between the source policy and the binary policy. The mapping file contains a hash of the source policy. The binary policy contains a hash of the mapping file.

The chaining of the policy representation results in two principles. First, if two binary policies are equal, that is, they match structurally, then the security policies associated with each binary policy are equal to each other. This is because it is computationally infeasible to find two different policies that yield the same hash value, or structure. Hashes are considered collision free, that is, it is unlikely that two different inputs will yield the same output. Second, a system can determine if a particular source policy is linked to a particular binary policy through the mapping file by walking the hash chain. The system checks if the hash contained in the mapping file matches a computed hash of the source policy. If so, the system then checks if the hash contained in the binary policy matches the computed hash of the mapping file. If a system is successful in walking the hash chain, the system can conclude that the particular source policy is linked to the particular binary policy.

Figure 4:
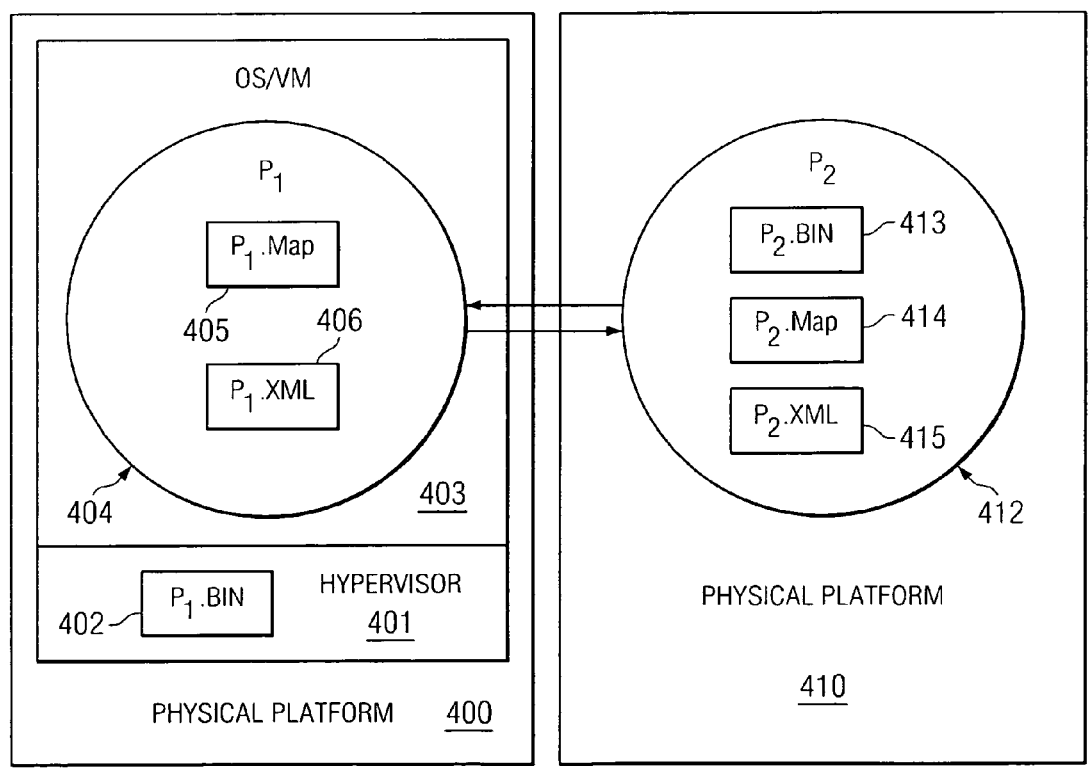
FIG. 4 is a block diagram depicting two physical platforms, in accordance with an exemplary embodiment of the present invention.

Turning back to the figures, FIG. 4 is a block diagram depicting two physical platforms, in accordance with an exemplary embodiment of the present invention. The two physical platforms 400 and 410 may be implemented on a data processing system such as data processing system 200 in FIG. 2, which may be implemented as either a server or a client in a network, such as server 104 and client 110 of network 102 in FIG. 1. Physical platform 400 includes a process P1 404 that runs on a virtualized system consisting of OS/VM 403 and hypervisor 401. Note that the process P1 404 is not required to run on a virtualized system. The only requirement is that the process P1 404 has access to source 406, mapping 405, and binary policy 402 files. In this example, the process P1 404 maintains the source 406 and mapping 405 policy files, and the hypervisor 401 maintains the binary policy 402 file. The physical platform 410 includes process P2 412 that maintains source 415, mapping 414, and binary policy 413 files. The process P2 412 can execute anywhere on any physical platform and the use of an operating system is optional. Furthermore, physical platforms 400 and 410 could run on the same physical platform via a virtualized system, such as a recursive virtualization environment, for example. The processes P1 404 and P2 412 communicate with each other via a network, such as network 102 in FIG. 1, using communication software running on their systems. In an exemplary embodiment of the present invention, process P1 404 and process P2 412 transfer policy information, including binary policy information and mapping files.

FIG. 5 is a block diagram illustrating hash generation, in accordance with an exemplary embodiment of the present invention. Hash generation 500 shows hash generation and chaining from a source policy to a binary policy. Source policy 512 and user-defined extension X 514 are combined together to form input to the cryptographic hash function 502, which yields source hash 504. Source hash 504 is then combined with user-defined extension Y 518 and mapping file 516 to form input to the cryptographic hash function 506, which yields mapping hash 508. Mapping hash 508 is combined with policy encoding 520 to form binary policy 510.

X 514 and Y 518 are user-defined extensions used to customize a policy to a particular environment. That is, X 514 and Y 518 may be used to bind specific events or application scenarios, such as a user identification or application identification, to the policy in order to more uniquely identify and bind the policy.

Optionally, to establish authorship and provide integrity protection, a digital signature is appended to the binary policy file. The digital signature is used to verify that the binary policy was generated from a source which is trusted to use the actual source and mapping policy files, and that the binary file has not been altered.

Figure 6:
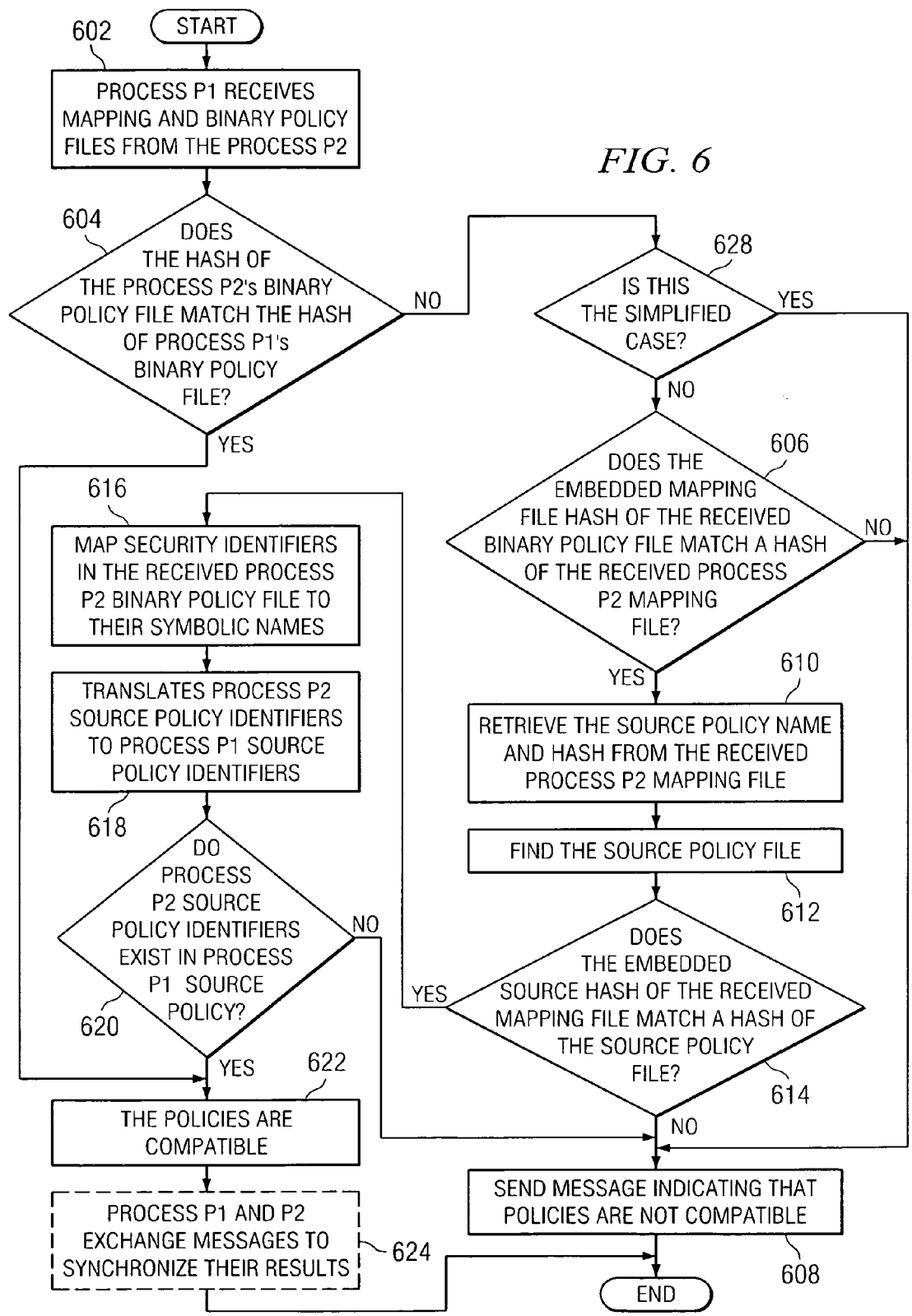
FIG. 6 is a flowchart illustrating the operation of verifying compatible policies, in accordance with an exemplary embodiment of the present invention.

FIG. 6 is a flowchart illustrating an operation of verifying compatible policies, in accordance with an exemplary embodiment of the present invention. The operation begins when the process P1 receives the mapping and binary policy files from the process P2 (step 602). The process P1 determines if a hash of the process P2's binary policy file matches the hash of the process P1's binary policy file (step 604). If the hash of the process P2's binary policy file matches the hash of the process P1's binary policy file (a yes output to step 604), then the policies are determined to be compatible (step 622) and the operation ends.

If the hash of the process P2's binary policy file does not match the hash of the process P1's binary policy file (a no output to step 604), then the process P1 determines if the binary policy from process P2 is a simplified hash of the binary policy (step 628). If process P1 determines that the binary policy from process P2 is a simplified hash of the binary policy (a yes output to step 628), then the process P1 sends a message indicating that the policies are not compatible (step 608) and the operation ends. If process P1 determines that the binary policy from process P2 is not a simplified hash of the binary policy (a no output to step 628), the process P1 determines if the mapping file hash embedded in the received binary policy file matches a hash, generated by the process P1, of the received process P2 mapping file (step 606).

If process P1 receives a mapping and a binary policy file from process P2, then the received binary file is not a simplified hash of the binary policy. Therefore, process P1 is able to determine if the binary policy from process P2 is a simplified hash of the binary policy by determining if process P1 did received both a binary policy file and a mapping file from process P2.

If the mapping file hash embedded in the received binary policy file does not match a hash, generated by the process P1, of the received process P2 mapping file (a no output to step 606), then the process P1 sends a message indicating that the policies are not compatible (step 608) and the operation ends.

If the mapping file hash embedded in the received binary policy file does match a hash, generated by the process P1, of the received process P2 mapping file (a yes output to step 606), then the process P1 retrieves the source policy name and hash from the received process P2 mapping file (step 610). Then the process P1 finds the source policy file (step 612) by looking for the file in some repository. The repository could be on the same physical platform, a file sent by the process P2, or a location on a remote location. Then the process P1 determines if the source hash embedded in the received mapping file matches a hash, generated by the process P1, of the source policy file (step 614). If the source hash embedded in the received mapping file does not match a hash, generated by the process P1, of the source policy file (a no output to step 614), then the process P1 sends a message indicating that the policies are not compatible (step 608) and the operation ends.

If the source hash embedded in the received mapping file does match a hash, generated by the process P1, of the source policy file (a yes output to step 614), then the process P1 maps security identifiers in the received process P2 binary policy file to their symbolic names (step 616). The process P1 then translates the process P2's source policy identifiers to the source policy identifiers of process P1 (step 618). Then the process P1 determines if certain, important source policy identifiers of the process P2 exist in the process P1's source policy (step 620). That is, once the translation is complete, the process P1 verifies if certain, important identifiers in the process P2's source policy have a corresponding identifier in the process P1's source policy.

If source policy identifiers do not exist in the process P1's source policy (a no output to step 620), then the process P1 sends a message indicating that the policies are not compatible (step 608) and the operation ends. If source policy identifiers do exist in the process P1's source policy (a yes output to step 620), then the policies are compatible (step 622) and the operation ends. Optionally, after step 622 and before the operation ends, processes P1 and P2 may exchange messages to synchronize their results (step 624) and to ensure that they both agree that the policies are compatible. While the operation has been described in terms of the process P1, both processes may perform the check; however, the invention is not so limited. In such a case, steps identical to those performed by the process P1 would be performed by the process P2. In another exemplary embodiment of the present invention, only the process P2 performs the check.

FIG. 7 is a block diagram illustrating a simplified hash generation of a binary policy in accordance with an exemplary embodiment of the present invention. IN particular, an exemplary embodiment of the present invention provides for a simplified hash generation and chaining from the source policy directly to the binary policy. Source policy 712 and user-defined extension X 714 are combined to form input to cryptographic hash function 702, which yields source hash 704. Source hash 704 is combined with policy encoding 708 to form binary policy 706.

The exemplary embodiment reduces the process of verifying compatible polices to checking if the binary polices match structurally. Turning to FIG. 6, the operation begins when the process P1 receives a binary policy file only from the process P2 (step 602). The process P1 determines if a hash of the process P2's binary policy file matches the hash of the process P1's binary policy file (step 604). If the hash of the process P2's binary policy file matches the hash of the process P1's binary policy file (a yes output to step 604), then the policies are determined to be compatible (step 622) and the operation ends.

If the hash of the process P2's binary policy file does not match the hash of the process P1's binary policy file (a no output to step 604), then the process P1 determines if the binary policy from process P2 is a simplified hash of the binary policy (step 628). Since process P1 received only the binary policy file, this is the simplified case (a yes output to step 628). The process P1 then sends a message indicating that the policies are not compatible (step 608) and the operation ends.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for protecting policy state information during the lifetime of a virtual machine, the computer implemented method comprising:
    creating by a processing unit of a data processing system a source policy in combination with a first extension;
    creating by the processing unit a mapping policy, wherein the mapping policy maps between the source policy and a binary policy; and contains a second extension and a hash of the source policy and the first extension;
    creating by the processing unit the binary policy, wherein the binary policy contains a hash of the mapping policy and the second extension; and wherein the source policy, the mapping policy, and the binary policy form a chain of different representations of a security policy, wherein the first extension and the second extension are user defined and are used to customize the security policy to a particular environment; and
    determining compatibility of the security policy with another security policy using the binary policy.

2. The computer implemented method of claim 1, further comprising:
    deriving the mapping policy from the source policy.

3. The computer implemented method of claim 1, further comprising:
    deriving the binary policy from the mapping policy.

4. The computer implemented method of claim 1, further comprising:
    deriving the binary policy from the source policy.

5. The computer implemented method of claim 1, further comprising:
    chaining the source policy, the mapping policy, and the binary policy together via cryptographic hashes.

6. The computer implemented method of claim 5, further comprising:
    performing a cryptographic hash on the source policy to form a source hash.

7. The computer implemented method of claim 6, wherein the first extension comprising a user defined extension is combined with the source policy before the cryptographic hash is performed.

8. The computer implemented method of claim 6, further comprising:
    performing a cryptographic hash on the mapping policy combined with the source hash to form a mapping hash.

9. The computer implemented method of claim 8, wherein the second extension comprising a user defined extension is combined with the mapping policy and the source hash before the cryptographic hash is performed.

10. The computer implemented method of claim 8, wherein the binary policy comprises policy encoding combined with the mapping hash.

11. A non-transitory computer usable medium having computer usable program code stored thereon for protecting policy state information during the lifetime of a virtual machine, the computer usable program code comprising:
    computer usable program code for creating a source policy in combination with a first extension;
    computer usable program code for creating a mapping policy, wherein the mapping policy maps between the source policy and a binary policy; and contains a second extension and a hash of the source policy and the first extension; and
    computer usable program code for creating the binary policy, wherein the binary policy contains a hash of the mapping policy and the second extension; and wherein the source policy, the mapping policy; and the binary policy form a chain of different representations of a security policy, wherein the first extension and the second extension are user defined and are used to customize the security policy to a particular environment; and
    determining compatibility of the security policy with another security policy using the binary policy.

12. The non-transitory computer usable medium of claim 11, further comprising:
    computer usable program code for chaining the source policy, the mapping policy, and the binary policy together via cryptographic hashes.

13. The non-transitory computer usable medium of claim 12, further comprising:
    computer usable program code for performing a cryptographic hash on the source policy to form a source hash.

14. The non-transitory computer usable medium of claim 13, wherein the first extension comprising a user defined extension is combined with the source policy before the cryptographic hash is performed.

15. The non-transitory computer usable medium of claim 13, further comprising:
    computer usable program code for performing a cryptographic hash on the mapping policy and the second extension combined with the source hash to form a mapping hash.

16. The non-transitory computer usable medium of claim 15, wherein the second extension comprising a user defined extension is combined with the mapping policy and the source hash before the cryptographic hash is performed.

17. A data processing system for protecting policy state information during the lifetime of a virtual machine, said data processing system comprising:
    a storage device for storing computer usable program code; and
    a processor for executing the computer usable program code for creating a source policy in combination with a first extension; creating a mapping policy, wherein the mapping policy maps between the source policy and a binary policy; and contains a second extension and a hash of the source policy and the first extension; creating the binary policy, wherein the binary policy contains a hash of the mapping policy and the second extension; and wherein the source policy, the mapping policy, and the binary policy form a chain of different representations of a security policy, wherein the first extension and the second extension are user defined and are used to customize the security policy to a particular environment; and determining compatibility of the security policy with another security policy using the binary policy.

18. The data processing system of claim 17, wherein the processor further executes the computer usable program code for chaining the source policy, the mapping policy, and the binary policy together via cryptographic hashes.

19. The data processing system of claim 17, wherein the processor further executes the computer usable program code for performing a cryptographic hash on the source policy to form a source hash and wherein the first extension comprising a user defined extension is combined with the source policy before the cryptographic hash is performed.

20. The data processing system of claim 17, wherein the processor further executes the computer usable program code for performing a cryptographic hash on the mapping policy combined with the source hash to form a mapping hash and wherein the second extension comprising a user defined extension is combined with the mapping policy and the source hash before the cryptographic hash is performed.

* * * * *